(12) United States Patent
Hartlaub et al.

(10) Patent No.: US 11,144,662 B2
(45) Date of Patent: *Oct. 12, 2021

(54) EFFICIENT EVALUATION OF HIERARCHICAL PERMISSION DATA IN DISTRIBUTED COMPUTER SYSTEMS

(71) Applicants: Atlassian Pty Ltd, Sydney (AU); Atlassian, Inc., San Francisco, CA (US)

(72) Inventors: Jon Hartlaub, Mountain View, CA (US); Mikhail Denis D'Souza, Sydney (AU)

(73) Assignees: ATLASSIAN PTY LTD., Sydney (AU); ATLASSIAN INC., San Francisco, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/575,872

(22) Filed: Sep. 19, 2019

(65) Prior Publication Data

US 2020/0311293 A1    Oct. 1, 2020

Related U.S. Application Data

(63) Continuation of application No. 16/368,752, filed on Mar. 28, 2019, now Pat. No. 10,445,521.

(51) Int. Cl.
*G06F 21/62* (2013.01)
*G06F 7/523* (2006.01)

(52) U.S. Cl.
CPC .......... *G06F 21/6218* (2013.01); *G06F 7/523* (2013.01)

(58) Field of Classification Search
CPC .............................. G06F 21/6218; G06F 7/523

USPC .......................................................... 726/29
See application file for complete search history.

(56) References Cited

U.S. PATENT DOCUMENTS

| | | | | |
|---|---|---|---|---|
| 7,260,555 B2 * | 8/2007 | Rossmann | .............. | G06F 12/14 705/51 |
| 7,380,120 B1 * | 5/2008 | Garcia | .................... | G06F 21/60 713/160 |
| 7,565,683 B1 * | 7/2009 | Huang | ................ | G06F 21/6209 713/171 |
| 7,634,455 B1 * | 12/2009 | Keene | ................. | G06F 21/6245 |
| 2003/0110397 A1 * | 6/2003 | Supramaniam | ......... | H04L 67/42 726/1 |

(Continued)

*Primary Examiner* — Michael S McNally
(74) *Attorney, Agent, or Firm* — Brownstein Hyatt Farber Schreck, LLP (57) ABSTRACT

Systems and methods for evaluation hierarchical permissions are described herein. In an embodiment, a system identifies a plurality of permission sets for a document that is digitally stored in a data repository system, the data repository system having a hierarchical organization, the plurality of permission sets comprising a first permission set for a first hierarchical level of the data repository system and a second permission set for a second hierarchical level of the data repository system. Using at least the first permission set and the second permission set, the system identifies a plurality of requirement sets, each of the plurality of requirement sets comprising one or more required identifiers to satisfy the requirement set. When the system receives a request to access the document, the system determines whether identifiers corresponding to the request satisfy at least one requirement set of the plurality of requirement sets and, if so, permits access to the document.

16 Claims, 4 Drawing Sheets

(56) References Cited

U.S. PATENT DOCUMENTS

2014/0059705 A1* 2/2014 Kuwako ............... H04L 63/104
 726/28
2015/0058460 A1* 2/2015 Seago .................... H04L 41/28
 709/223

* cited by examiner

EFFICIENT EVALUATION OF HIERARCHICAL PERMISSION DATA IN DISTRIBUTED COMPUTER SYSTEMS

BENEFIT CLAIM

This application claims the benefit as a Continuation of application Ser. No. 16/368,752, filed Mar. 28, 2019 the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

FIELD OF THE DISCLOSURE

One technical field of the present disclosure relates to evaluating access controls for electronic documents in a digital data repository having a hierarchical organization.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Further, it should not be assumed that any of the approaches described in this section are well-understood, routine, or conventional merely by virtue of their inclusion in this section.

Shared data repositories allow various users to access, share, edit, and otherwise interact with the same electronic digital documents. Large organizations can have extremely large data repositories with a large number of documents being shared across a large number of users.

While large data repositories allow organizations to consolidate electronic digital documents, the large data repositories often have to be paired with access controls in order to limit the access of users to specific documents. Access controls can be used to limit access to individual documents, folders, or portions of the data repository to specific users, groups, roles, or other identifying information.

In order to more effectively apply access controls to groups of documents, some data repositories have a hierarchical organization. In a hierarchical organization, individual hierarchical levels can have their own access controls. For instance, a first folder can be limited to one portion of an organization while a second folder within the first folder can be limited to a subset of the portion of the organization. While hierarchical levels often have overlapping permissions where higher levels comprise each of the permissions of a lower level, the overlapping permissions are not always required.

Effectively evaluating permissions for a document in a data repository having a hierarchical organization can be computationally expensive, especially when the document is within a large number of hierarchical levels, each with different permission sets identifying users, groups, roles, or other identifying information which have the right to access each level. To evaluate such a document, the system would need to evaluate the requester against each hierarchical level that encompasses the document. The larger the data repository is, the longer and more computationally expensive evaluating document permissions becomes.

Thus, there is a need for a system which allows for the efficient evaluation of permissions in a data repository having a hierarchical organization.

SUMMARY

The appended claims may serve as a summary of the disclosure.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Embodiments are disclosed in sections according to the following outline:

1. GENERAL OVERVIEW
  2. STRUCTURAL OVERVIEW
  3. EFFICIENT EVALUATION OF HIERARCHICAL PERMISSIONS
    3.1 FUNCTIONAL OVERVIEW
    3.2 FUNCTIONAL EXAMPLE
    3.3 PREFIXES
    3.4 EVALUATION OF QUERIES
  4. BENEFITS OF CERTAIN EMBODIMENTS
  5. HARDWARE OVERVIEW
  6. CLOUD COMPUTING 1. General Overview Systems and methods for efficiently evaluating hierarchical permissions are described. According to an embodiment, a server computer identifies, for a particular document, a plurality of permission sets pertaining to a plurality of hierarchical levels which encompass the particular document. The server computer uses the plurality of permission sets to compute a plurality of requirement sets for the particular document and stores the requirement sets in an index for the document. When a request to access the document is received, the server computer evaluates the request against the requirement sets for the document. If the request satisfies at least one of the requirement sets, the server computer permits access to the document. Otherwise, the server computer denies access to the document.

In an embodiment, a method comprises identifying a plurality of permission sets for a document that is digitally stored in a data repository system, the data repository system having a hierarchical organization, the plurality of permission sets comprising a first permission set for a first hierarchical level of the data repository system and a second permission set for a second hierarchical level of the data repository system; wherein the first permission set includes one or more identifiers with permissive access to documents within the first hierarchical level and the second permission set includes one or more identifiers with permissive access to documents within the second hierarchical level; using at least the first permission set and the second permission set, computing a plurality of requirement sets, each of the plurality of requirement sets comprising one or more required identifiers to satisfy the requirement set; receiving a request to access the document, the request comprising one or more particular identifiers; in response to determining that the one or more particular identifiers satisfies all of the one or more required identifiers of at least one requirement set of the plurality of requirement sets, permitting access to the document in response to the request; in response to determining that the one or more particular identifiers fails to satisfy all of the one or more required identifiers of the at least one requirement set of the plurality of requirement sets, denying access to the document in response to the request.

2. Structural Overview

Figure 1:
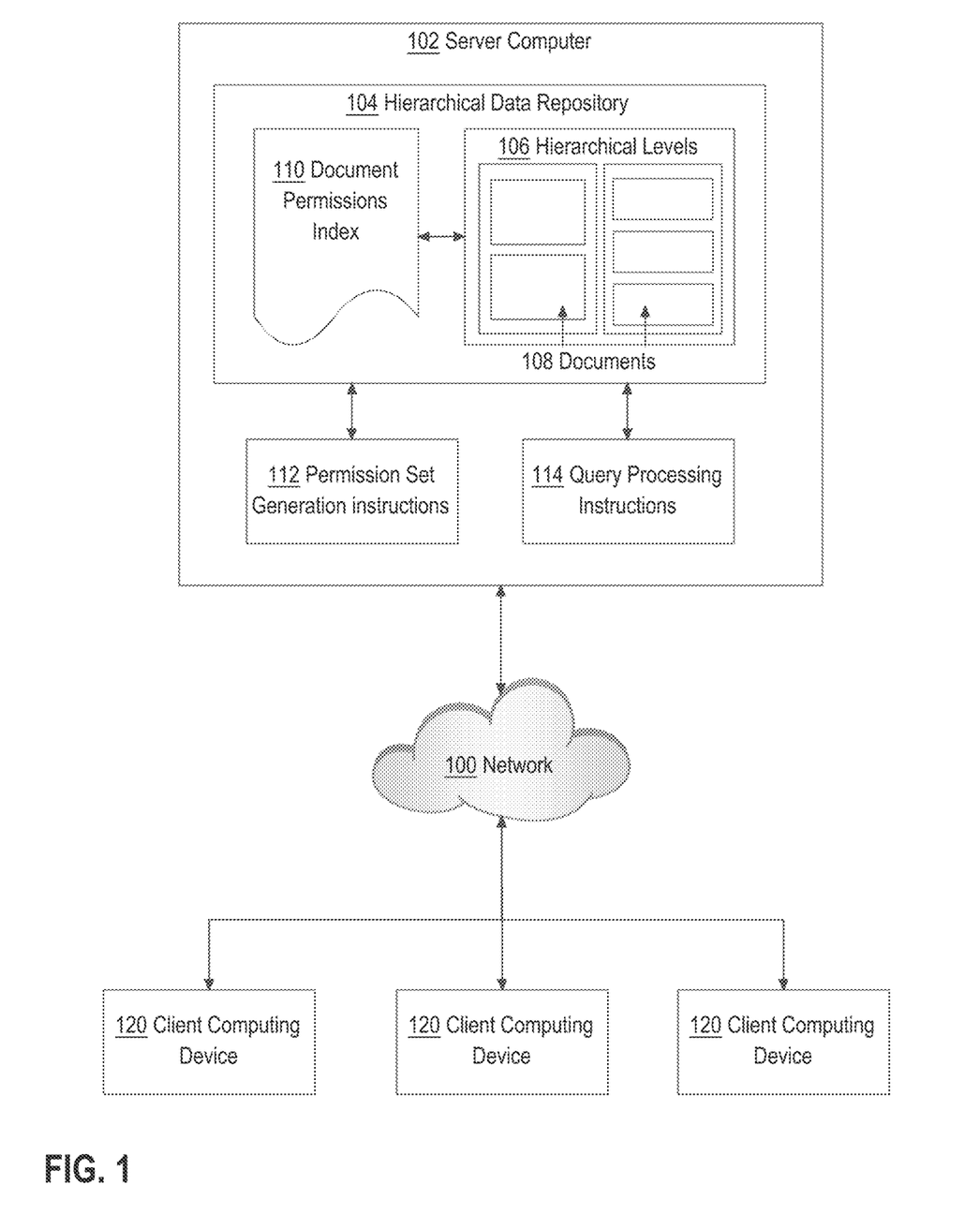
FIG. 1 depicts an example system for providing hierarchical access controls for a plurality of documents.

FIG. 1 depicts an example system for providing hierarchical access controls for a plurality of documents.

Network 100 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The server computer 102 and client computing devices 120 each comprise an interface compatible with the network(s) 100 and are programmed or configured to use standardized protocols for communication across the networks such as TCP/IP, Bluetooth, CAN protocol and higher-layer protocols such as HTTP, TLS, and the like.

Server computer 102 may be implemented using a server-class computer or other computers having one or more processor cores, co-processors, or other computers. Server computer 102 may be a physical server computer and/or a virtual server instance stored in a data center, such as through cloud computing. In an embodiment, server computer 102 comprises a hierarchical data repository 104, permission set generation instructions 112, and query processing instructions 114. Server computer 102 may be configured to selectively provide documents to a client computing device 120 in response to requests to access documents by evaluating permission sets corresponding to the documents.

Hierarchical data repository 104 comprises a data repository having a hierarchical organization. The hierarchical data repository 104 includes hierarchical levels 106 each of which may be accessed only if a query satisfies requirements for access to higher levels. For instance, documents in a particular level may be restricted to a first set of users and a first group type. If a second level is beneath the particular level in the hierarchical organization, documents in the second level may be restricted to the first set of users and the first group type in addition to any requirements for the second level. As a practical example, the first level may be a first file folder and the second level may be a second file folder within the first file folder.

Documents 108 are stored in hierarchical data repository 104 within one or more hierarchical levels 106. Hierarchical levels 106 may comprise one or more permission sets. The permission sets may include identifiers with permissive access to the document. As used herein, permissive access to a document refers to an ability to access a document if any of the identifiers are satisfied. For example, if identifiers for a particular hierarchical level comprise "u123" and "gFood", then documents or other hierarchical levels within the particular hierarchical level may be accessed by either the user identified as "u123" or any user within the group "gFood".

Permission sets may include identifiers of particular users, particular groups, user types, user roles, and/or any other distinguishing characteristic that can be extracted from a query. For instance, one hierarchical level may include a permission set which includes a manager class identifier, the manager class comprising all users identified as managers, while another hierarchical level may include a permission set which includes specific user identifiers and a group identifier. In an embodiment, hierarchical levels without permission sets will inherit the permission set of the parent level. Thus, if a parent hierarchical level has a permission set comprising three user identifiers, the child hierarchical level may additionally include a permission set comprising the three user identifiers. Permission sets may also include some identifiers which must be matched in conjunction, such as two partially overlapping groups or a user identifier and a time.

The hierarchical data repository 104 further comprises a document permissions index 110. The document permissions index 110 comprises one or more data records which identify permissions for an individual document based on the permission sets in encompassing hierarchical levels. The document permissions index 110 may comprise, for a particular document, one or more requirement sets, the one or more requirement sets comprising one or more conditions, each of which must be satisfied in order to satisfy the requirement set. For example, one requirement set may be satisfied if the query comes from a particular user and a particular group. Requirement sets may be computed by the server computer 102 from different hierarchical level permission sets using the methods described in Section 3.

In an embodiment, the document permissions index 110 comprises prefixes for one or more requirement sets. A prefix, as used herein, refers to a subset of requirements for a requirement set. For instance, if a requirement set comprises ten requirements, the prefix may include only three of the ten requirements. Prefix generation is discussed in more detail in Section 3.3. The prefixes may be used as a first pass filter for search queries, as described further in Section 3.4.

In an embodiment, each of permission set generation instructions 112 and query processing instructions 114 comprises a set of one or more pages of main memory, such as RAM, in the server computer 102 into which executable instructions have been loaded and which when executed cause the agricultural intelligence computer system to perform the functions or operations that are described herein with reference to those modules. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each of the instructions also may represent one or more files or projects of source code that are digitally stored in a mass storage device such as non-volatile RAM or disk storage, in the server computer 102 or a separate repository system, which when compiled or interpreted cause generating executable instructions which when executed cause the agricultural intelligence computer system to perform the functions or operations that are described herein with reference to those modules. In other words, the drawing figure may represent the manner in which programmers or software developers organize and arrange source code for later compilation into an executable, or interpretation into bytecode or the equivalent, for execution by the server computer 102.

Each of client computing devices 120 is a computer that includes hardware capable of communicatively coupling the devices to one or more server computers, such as server computer 102 over one or more service providers. For example, a client computing device 120 may include a network card that communicates with server computer 102 through a home or office wireless router (not illustrated in FIG. 1) coupled to an internet service provider. Each of client computing devices 120 may be a smart phone, personal computer, tablet computing device, PDAs, laptop, or any other computing device capable of transmitting and receiving information and performing the functions described herein.

3. Efficient Evaluation of Hierarchical Permissions 3.1 Functional Overview

Figure 2:
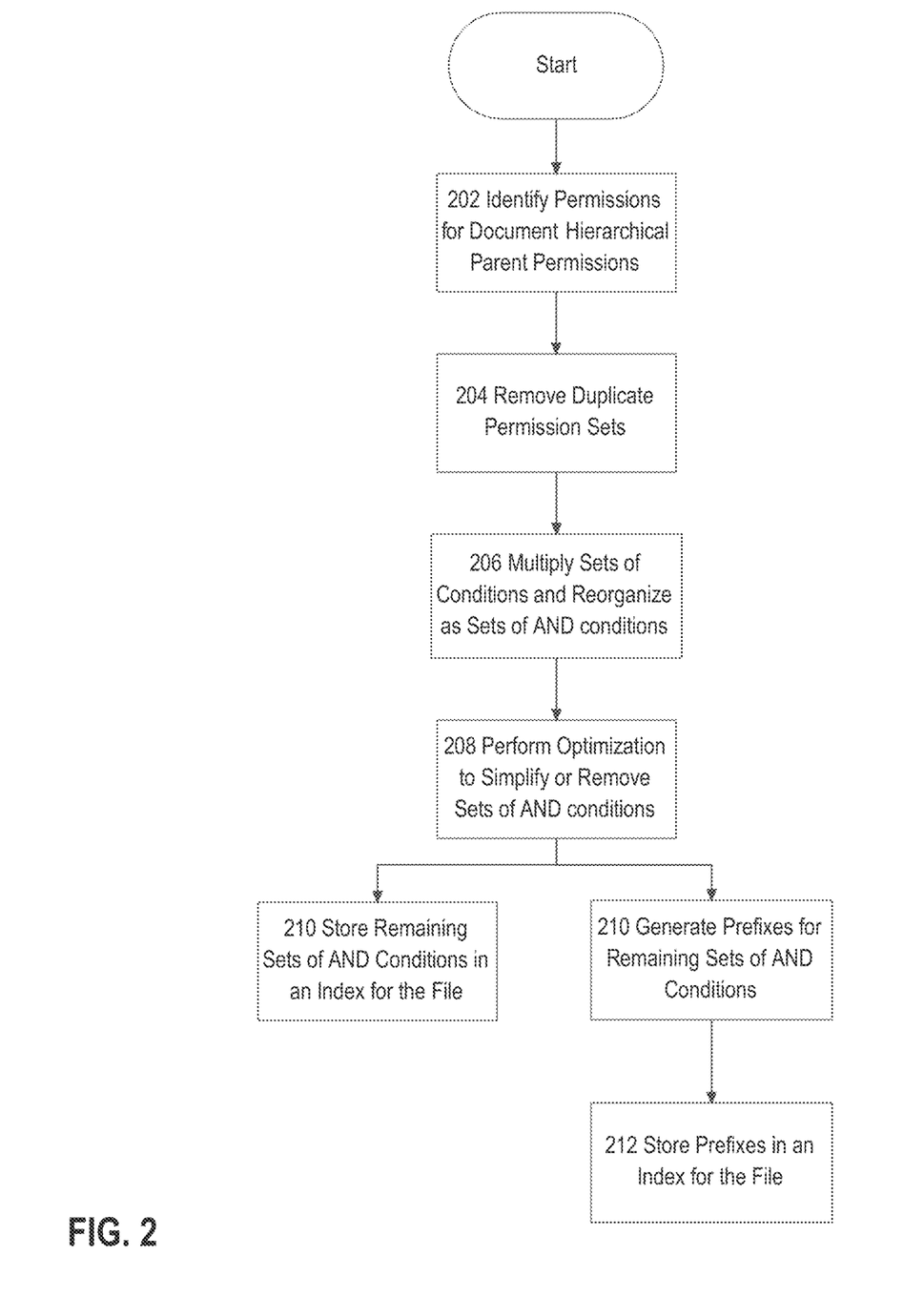
FIG. 2 depicts an example method for generating requirement sets for a document stored in a data repository having a hierarchical organization.

FIG. 2 depicts an example method for generating requirement sets for a document stored in a data repository having a hierarchical organization.

At step 202, the system identifies a plurality of permission sets for a document comprising one or more hierarchical parent permissions. Each permission set comprises one or identifiers or identifier groups, satisfaction of any of which may satisfy the permission set. For instance, an example permission set may comprise "u123 OR gTextile OR gFood AND rManager". In the example above, the permission set may be satisfied if the requesting user is either user 123, a user in the group of Textiles, or a user who is in the group of Food with a role of manager. For a particular document, the system may identify each permission set that relates to the document which may include the permission set for the document itself and each parent permission set, i.e. the permission sets for the hierarchical levels above the document which include the document within them. Thus, if there are three folders nested inside each other with the document nested in the final folder, the system may identify the permission set for each folder as well as the document.

Permission sets for a document may be identified when the document is created, stored, updated, or accessed. Additionally or alternatively, a system may initiate the methods described herein for each of a plurality of documents by identifying, for each document, the permission sets corresponding to the document. For example, a system may be updated to allow efficient evaluation of hierarchical permissions by computing requirement sets for each of a plurality of documents based on permission sets. The system may additionally identify permission sets for a document in response to a change in any of the hierarchical permissions for a document. For example, if a change in permission sets for a particular hierarchical level is performed, the system may execute the method of FIG. 2 for each document within the particular hierarchical level, including documents that are multiple levels lower.

In an embodiment, permission sets additionally include a type of allowed access for a document and/or hierarchical level. For example, a particular permission set may for a document may include a first identifier of gTextileR, indicating that users in the Textile group have read permission for the document, and a second identifier of gFoodW, indicating that users in the Food group have write permissions for the document.

At step 204, duplicate permission sets are removed. For instance, a first hierarchical level may comprise the same permissions as a lower hierarchical level because the lower level merely inherited the permission sets of a parent level and/or because documents within each level are organized to allow access to the same groups. For example, a first level may list only three users and a child level may also list only the same three users. When duplicate permission sets are identified, the system may consolidate the duplicates into a single permission set, thereby reducing the computational expense of the rest of the method.

At step 206, the sets of conditions are multiplied and reorganized as sets of AND conditions. Initially, the permission sets may be organized as requiring satisfaction of at least one of each of a plurality of permission sets. For example, with three hierarchical levels, each comprising a different permission set, the requirements to access a document may be organized as follows:

(id11 OR id12 OR . . . id1$n$) AND (id21 OR id22 OR . . . id2$n$) AND (id31 OR id32 OR . . . id3$n$).

In Boolean representation, the above permission sets are organized as sets of OR expressions that are connected by AND expressions. The system may use Boolean multiplication to generate individual AND expressions. For instance, (id11 OR id12) AND (id21 OR id22) multiplied out through Boolean multiplication would be: id11 AND id21 OR id AND id22 OR id12 AND id21 OR id12 AND id22. Reorganizing the resulting expression into sets of AND expressions would then generate four expressions, (id11 AND id21), (id11 AND id22), (id12 AND id21), and (id12 AND id22).

At step 208, optimization is performed to simplify or remove sets of AND conditions. The optimization techniques may be used to reduce the number of resulting expressing from the Boolean multiplication. Optimizations may include any of removing terms that by their nature will never match a query, simplifying repetitions, and subsuming subsets into more general terms. For example, a query may not be able to be received from two users simultaneously. Thus, a term of (user123 AND user456) may be removed because the term, but its nature, will never match a query. As another example, a term a repetition, such as (gTextile) AND (gTextile), can be simplified to the remove the repeated term, such as reducing (gTextile) AND (gTextile) to just (gTextile). As another example, the existence of the term (gTextile) on its own may subsume any expression that includes (gTextile), which would be a subset of the (gTextile) expression. Additionally, lower level permissions may be subsumed into higher level permission. For example, if a resulting expression includes (gTextileR AND gTextileW), the system may simplify the expression to just (gTextileW).

The optimization techniques may be performed after the Boolean multiplication to reduce the number of results and/or during the Boolean multiplication to reduce the required processing. For example, if the system is multiplying out three hierarchical levels of permission sets, the system may initially multiply the first two levels, perform the simplifications described above, and then multiply the remaining results with the final level. Thus, the system is able to reduce the computational power required to generate requirement sets by skipping the expansion of terms or simplifying expanded terms prior to completing the processing of the permission sets.

In one embodiment, at step 210, the remaining sets of AND conditions are stored in an index for the document. For example, the system may store an entry in the index that identifies the document as well as each computed requirement set. In an embodiment, an index is generated for each document which is populated with each requirement set for the document. The index may be stored separately from the document such that all documents can be evaluated from a single location and/or as part of a header of the document, thereby allowing access to the particular document to be restricted. A requirement set may be given a lowest level of access of the terms in the requirement set. Thus, a set of (gTextileR AND gFoodW) may be stored as (gTextile AND gFood)R.

In another embodiment, at step 212, prefixes for remaining sets of AND conditions are generated. A prefix, as used herein, refers to a subset of requirements for a requirement set. For example, if a requirement set comprises ten terms, the system may store only the first two terms as the prefix. In an embodiment, a single prefix may be identified which covers a maximum number of requirement sets, thereby reducing storage requirements for the document. For example, if six of seven requirement sets include the terms (gTextile) and (rManager), the system may store one prefix of (gTextile AND rManager) and a second prefix corresponding to the seventh requirement set. Thus, instead of storing seven prefixes, the system is able to reduce the number of stored prefixes to two.

At step 214, the prefixes are stored in an index for the file. For example, the system may store an entry in the index that identifies the document as well as each computed requirement set and/or prefix. In an embodiment, an index is generated for each document which is populated with each requirement set and/or prefix for the document. The index may be stored separately from the document such that all documents can be evaluated from a single location and/or as part of a header of the document, thereby allowing access to the particular document to be restricted. For each stored prefix, the system may store one or more remainders of the requirement set, such as in an additional index or in a separate location, thereby reducing the number of terms to be evaluated on a first pass by the server computer 102.

3.2 Functional Example

Figure 3:
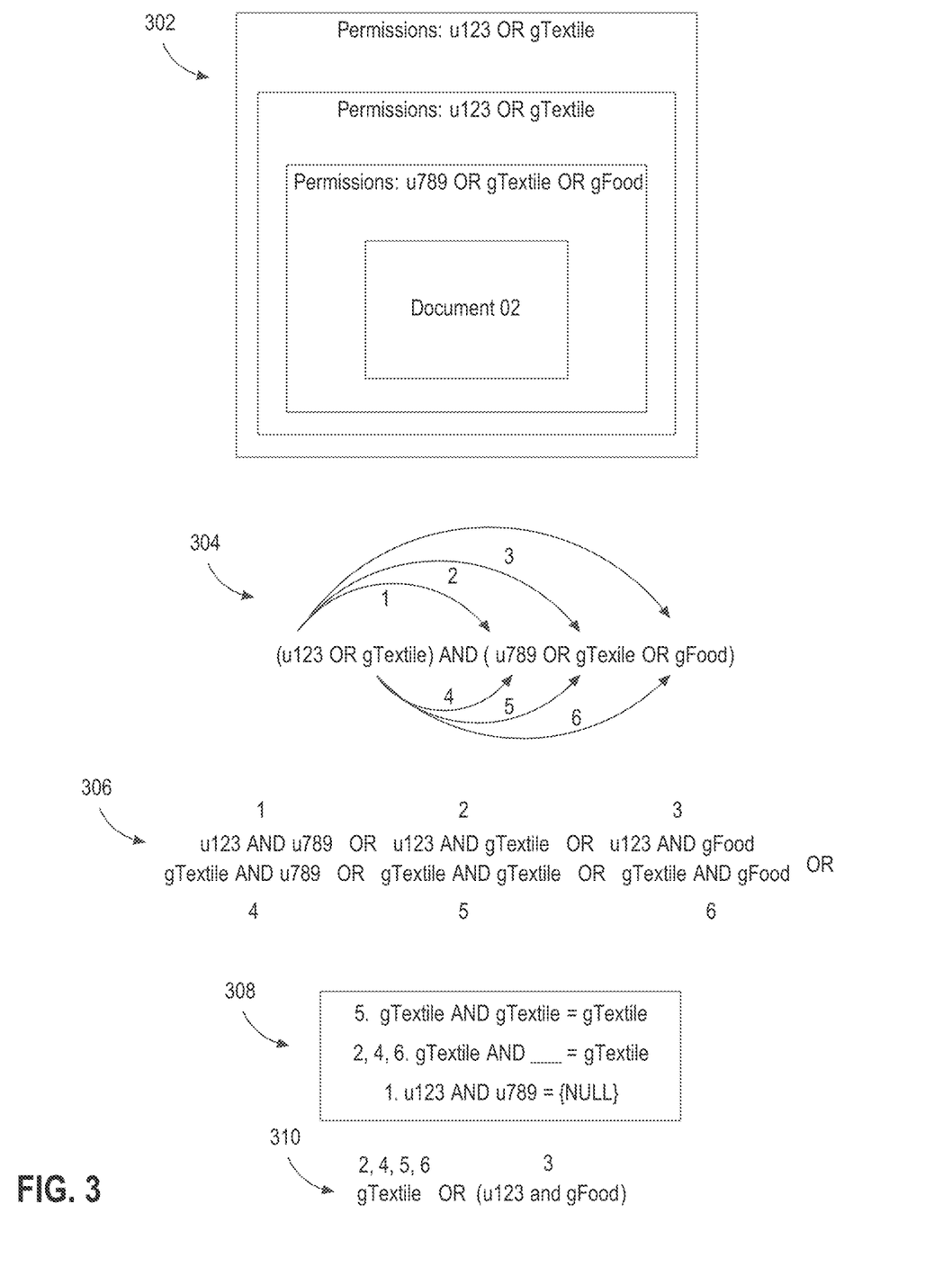
FIG. 3 depicts a functional example of generating requirement sets for a document stored in a data repository having a hierarchical organization.

FIG. 3 depicts a functional example of generating requirement sets for a document stored in a data repository having a hierarchical organization. In FIG. 3, Document 02 is stored in a data repository in a hierarchical organization where a plurality of levels of the hierarchy have different permission sets. The hierarchical level containing document 02 comprises a permission set that can be satisfied by any of u789, gTextile, or gFood. The parent hierarchical level comprises a permission set that can be satisfied by any of u123 or gTextile. Finally, the highest hierarchical level comprises a permission set that can also be satisfied by any of u123 or gTextile.

As both the parent hierarchical level and the highest hierarchical level in FIG. 3 comprise the same permission set, at step 302, the equivalent permission sets are identified, and one is removed. Thus, at step 304, only two permission sets remain, one permission set comprising u123 or gTextile and one permission set comprising u789 or gTextile or gFood. At step 304, the system performs Boolean multiplication by connecting each term in the first permission set with each term from the second permission set in conjunctive expressions. Thus, at step 306, six different requirement sets have been generated, one for each combination of a term in the first permission set with a term in the second permission set.

At step 308, the system performs a plurality of optimizations. The first optimization occurs with respect to requirement set 5 from step 306 which comprises (gTextile AND gTextile). Given that both terms are the same, the system reduces the term to just gTextile. The second optimization occurs with respect to requirement sets 2, 4, and 6 from step 306, each of which comprise gTextile and an additional term. Since satisfaction of gTextile alone would satisfy requirement set 5, each of requirement sets 2, 4, and 6 can be subsumed into a requirement set of gTextile. The final optimization of step 308 occurs with respect to requirement set 1 from step 306. As a single user is not capable of being both user 123 and user 789, requirement set 1 can never be satisfied and is thus removed.

At step 310 the remaining requirement sets are stored in a data repository. The first requirement set of gTextile is an optimization of requirement sets 2, 4, 5, and 6. The second requirement set originates from requirement set 3 of step 306 and remains unaffected by the optimization step of 308. Requirement set 1 was removed as being impossible to satisfy. Thus, the optimization step 308 reduced six requirement sets to only two requirement sets. Given a larger number of hierarchical levels, the optimizations of step 308 can greatly reduce the strain on the system of computing requirement sets as branches that can be reduced or removed can be identified early, thereby reducing a number of terms that need to be processed.

3.3 Prefixes

In an embodiment, the system stores an index comprising each remaining requirement set as described in step 210 of FIG. 2 and depicted in step 310 of FIG. 3. The index of requirement sets allows for a document to be quickly evaluated to determine whether a user is capable of accessing the document, as a user only needs to match one of the requirement sets for the document. While storing each requirement set can be feasible for simple examples, such as the one depicted in FIG. 3, storing each requirement set can be more memory intensive when the method is performed with a large number of hierarchical levels and computationally expensive to evaluate with respect to a query.

In another embodiment, the system generates prefixes for requirement sets and stores the prefixes in an index. For example, the system may reduce a requirement set to only the first few terms and store the first few terms in an index. By generating and storing an index comprising prefixes with the first few terms of a requirement set, the system generates a first pass filter for queries that allow the queries to be evaluated on a much smaller document. If the query does not satisfy any of the prefixes, the query would not satisfy any of the longer requirement sets, thereby ending evaluation of the document.

The system may generate prefixes when a number of terms in a requirement set exceed a stored threshold value. For example, the system may store a threshold number of terms for a requirement set, such as three terms. If a requirement set contains more than the threshold number of terms, the system may generate a prefix of the requirement set. The system may also store data indicating that the stored prefix is a prefix of a requirement set in order to differentiate the prefix from a requirement set that merely has a small number of terms.

In an embodiment, the system generates prefixes in a manner that reduces a number of prefixes stored for the document. For example, if the prefix is set at two terms, the system may identify two terms that are stored in the highest number of requirement sets. The system may then store the two terms as a prefix for each of the requirement sets that contain the two terms. In this manner, a number of stored prefixes can be reduced, thereby further reducing the computational cost of evaluating a document for a particular query.

3.4 Evaluation of Queries

The systems and methods described herein allow a system to efficiently evaluate permissions for a document in response to a query. When the server computer 102 receives a request to access a document, the server computer 102 may initially identify the requester. Identifying the requester may include determining a user identifier for the requester, identifying one or more groups for the identifier, and/or identifying one or more roles for the identifier. Additionally or alternatively, the server computer 102 may determine additional relevant information regarding the request, such as a time of the request, a location of the request, and/or a source of the request.

The server computer 102 may determine whether any of the information regarding the request to access the document satisfies all of the requirements of any of the requirement sets. For example, if a requirement set is satisfied by (u123 AND gFood), the server computer may determine that the request only satisfies the requirement set if the request was made by user 123 and user 123 is a member of Food group.

In embodiments where the server computer 102 stores prefixes for one or more requirement sets, the server computer 102 may use the index comprising the stored prefixes and/or additional requirement sets as a first pass filter. For example, if the server computer determines that the request fails to satisfy any of the prefixes and/or additional requirement sets of the stored index, the server computer may determine that the requester is to be barred access from the document. Alternatively, if the server computer 102 determines that the request satisfies any of the prefixes, the server computer 102 may further evaluate the document to determine if the query satisfies any expanded requirement set from the satisfied prefix.

In an embodiment, the server computer 102 evaluates prefixes and/or requirement sets until a match is identified. If the identified match is a full requirement set, the server computer 102 may determine that the document may be accessed in response to the request. If the identified match is a prefix, the server computer 102 may evaluate the rest of the requirement set. If the request satisfies the rest of the requirement set, the server computer 102 may determine that the document may be accessed in response to the request. If the request fails to satisfy the rest of the requirement set, the server computer 102 may evaluate any remaining requirement sets and/or prefixes until none remain or the request has satisfied at least one full requirement set.

The server computer 102 may evaluate permissions in response to a particular request to access a particular document and/or a request to access a plurality of documents including the particular document. For example, if the server computer 102 receives a request to search for a document that satisfies one or more criteria, the server computer 102 may use the methods described herein to filter documents that satisfy the one or more criteria to a subset of documents that both satisfy the one or more criteria and are accessible by the requester. Thus, for each document that satisfies the one or more criteria, the server computer 102 may evaluate a requirement set index to determine whether the requester satisfies any of the requirement sets for the document. The server computer 102 may then only return documents where the requester satisfies at least one of the requirement sets for accessing the document.

4. Benefits of Certain Embodiments

The systems and methods described herein improve a computer's ability to evaluate permissions for accessing documents in a data repository with a hierarchical organization. Instead of evaluating access to each level of a hierarchy, the system initially computes requirement sets for each document based on higher hierarchy levels. When a document needs to be evaluated, instead of evaluating each individual hierarchical level, the system can just evaluate the stored requirement sets.

Additionally, the server computer may further benefit from storing prefixes when requirement sets contain a large number of terms, such as a number greater than a stored threshold value. The server computer may use the stored prefixes as a first pass filter, thereby reducing a number of terms to be evaluated when evaluating requirement sets for a document.

These systems and methods increase the efficiency with which a server computer is able to evaluate permissions for individual documents, thereby reducing the processing power required for evaluating a large number of documents or for evaluating a document within a large number of hierarchical levels. Additionally, the systems and methods described herein provide a server computer with an efficient way of selectively permitting or denying access to documents based on a stored index for the document which can be easily accessed when a document is evaluated.

5. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
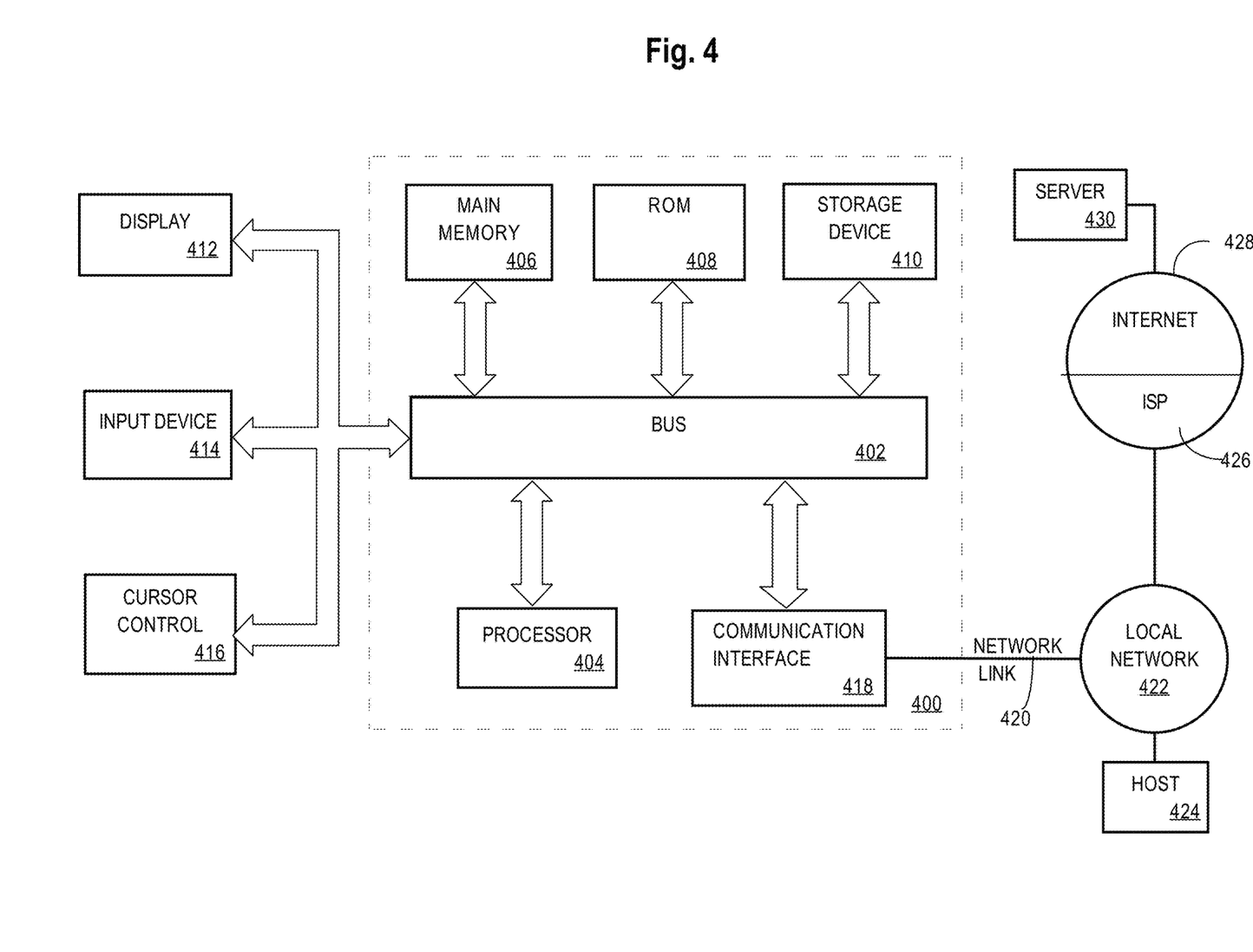
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

6. Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   storing a plurality of requirement sets for a document that is digitally stored in a data repository system, the data repository system having a hierarchical organization, each of the plurality of requirement sets comprising one or more required identifiers to satisfy a requirement set;
   generating, for one or more of the plurality of requirement sets, one or more requirement prefixes, the one or more requirement prefixes comprising a strict subset of the one or more required identifiers in the one or more of the plurality of requirement sets;
   storing the one or more requirement prefixes in an index;
   receiving a request to access the document, the request comprising one or more particular identifiers;
   in response to determining that the one or more particular identifiers fail to satisfy all of the one or more required identifiers of any of the one or more requirement prefixes, denying access to the document in response to the request; and
   in response to determining that the one or more particular identifiers satisfy all of the one or more required identifiers in at least one of the one or more requirement prefixes, evaluating whether the one or more particular identifiers satisfy all of the one or more required identifiers in at least one requirement set of the plurality of requirement sets and, only if a particular identifier satisfies all of the one or more required identifiers in at least one of the plurality of requirement sets, permitting access to the document in response to the request.

2. The method of claim 1, further comprising:
   identifying a plurality of permission sets for the document, the plurality of permission sets comprising a first permission set for a first hierarchical level of the data repository system and a second permission set for a second hierarchical level of the data repository system, the first permission set including one or more identifiers with permissive access to documents within the first hierarchical level and the second permission set including one or more identifiers with permissive access to documents within the second hierarchical level; and
   using at least the first permission set and the second permission set, computing the plurality of requirement sets.

3. The method of claim 2, wherein computing the plurality of requirement sets comprises:
   performing a Boolean multiplication between at least the first permission set and the second permission set; and
   reorganizing one or more results of the Boolean multiplication into the plurality of requirement sets.

4. The method of claim 3, wherein:
   the plurality of permission sets comprises a third permission set for a third hierarchical level of the data repository system, the third permission set including one or more identifiers with permissive access to documents within the third hierarchical level of the data repository system; and
   the method further comprises:
      determining that the one or more identifiers of the third permission set are equivalent to the one or more identifiers of the second permission set; and
      in response, performing the Boolean multiplication between the at least the first permission set and the second permission set, but excluding the third permission set.

5. The method of claim 2, further comprising determining that a particular requirement set of the plurality of requirement sets comprises two mutually exclusive required identifiers; and
   in response, removing the particular requirement set from the plurality of requirement sets.

6. The method of claim 2, further comprising:
   determining that a particular requirement set of the plurality of requirement sets comprises duplicates of a required identifier; and
   in response, reducing the particular requirement set to include only one version of the duplicates of the required identifier.

7. The method of claim 2, further comprising:
   determining that a first requirement set of the plurality of requirement sets comprises the one or more required identifiers that are a strict subset of the one or more required identifiers of a second requirement set of the plurality of requirement sets; and
   in response, removing the second requirement set from the plurality of requirement sets.

8. The method of claim 2, further comprising:
   determining that a particular requirement set of the plurality of requirement sets comprises greater than a threshold number of the one or more required identifiers; and in response, generating the one or more requirement prefixes.

9. A system comprising:
one or more processors;
a memory storing instructions which, when executed by the one or more processors, causes performance of:
storing a plurality of requirement sets for a document that is digitally stored in a data repository system, the data repository system having a hierarchical organization, each of the plurality of requirement sets comprising one or more required identifiers to satisfy a requirement set;
generating, for one or more of the plurality of requirement sets, one or more requirement prefixes, the one or more requirement prefixes comprising a strict subset of the one or more required identifiers in the one or more of the plurality of requirement sets;
storing the one or more requirement prefixes in an index;
receiving a request to access the document, the request comprising one or more particular identifiers;
in response to determining that the one or more particular identifiers fail to satisfy all of the one or more required identifiers of any of the one or more requirement prefixes, denying access to the document in response to the request; and
in response to determining that the one or more particular identifiers satisfy all of the one or more required identifiers in at least one of the one or more requirement prefixes, evaluating whether the one or more particular identifiers satisfies satisfy all of the one or more required identifiers in at least one requirement set of the plurality of requirement sets and, only if a particular identifier satisfies all of the one or more required identifiers in at least one of the plurality of requirement sets, permitting access to the document in response to the request.

10. The system of claim 9, wherein the instructions, when executed by the one or more processors, further cause performance of:
identifying a plurality of permission sets for the document, the plurality of permission sets comprising a first permission set for a first hierarchical level of the data repository system and a second permission set for a second hierarchical level of the data repository system, the first permission set including one or more identifiers with permissive access to documents within the first hierarchical level and the second permission set including one or more identifiers with permissive access to documents within the second hierarchical level; and
using at least the first permission set and the second permission set, computing the plurality of requirement sets.

11. The system of claim 10, wherein computing the plurality of requirement sets comprises:

performing a Boolean multiplication between at least the first permission set and the second permission set; and
reorganizing one or more results of the Boolean multiplication into the plurality of requirement sets.

12. The system of claim 11, wherein:
the plurality of permission sets comprises a third permission set for a third hierarchical level of the data repository system, the third permission set including the one or more identifiers with permissive access to documents within the third hierarchical level of the data repository system; and
the instructions, when executed by the one or more processors, further cause performance of:
determining that the one or more identifiers of the third permission set are equivalent to the one or more identifiers of the second permission set; and
in response, performing the Boolean multiplication between at least the first permission set and the second permission set, but excluding the third permission set.

13. The system of claim 10, wherein the instructions, when executed by the one or more processors, further cause performance of:
determining that a particular requirement set of the plurality of requirement sets comprises two mutually exclusive required identifiers; and
in response, removing the particular requirement set from the plurality of requirement sets.

14. The system of claim 10, wherein the instructions, when executed by the one or more processors, further cause performance of:
determining that a particular requirement set of the plurality of requirement sets comprises duplicates of a required identifier; and
in response, reducing the particular requirement set to include only one version of the duplicates of the required identifier.

15. The system of claim 10, wherein the instructions, when executed by the one or more processors, further cause performance of:
determining that a first requirement set of the plurality of requirement sets comprises required identifiers that are a strict subset of required identifiers of a second requirement set of the plurality of requirement sets; and
in response, removing the second requirement set from the plurality of requirement sets.

16. The system of claim 9, wherein the instructions, when executed by the one or more processors, further cause performance of:
determining that a particular requirement set of the plurality of requirement sets comprises greater than a threshold number of required identifiers; and
in response, generating the one or more requirement prefixes.

* * * * *